United States Patent [19]

Heller

[11] 4,279,964

[45] Jul. 21, 1981

[54] FROTH COATING OF PAPER PRODUCTS AND PROCESS FOR FORMING SAME

[75] Inventor: David S. Heller, Dover, Del.

[73] Assignee: Reichhold Chemicals, Incorporated, White Plains, N.Y.

[21] Appl. No.: 97,144

[22] Filed: Nov. 26, 1979

[51] Int. Cl.³ .................. B32B 23/08; B32B 27/10; B05D 3/12; B05D 3/02
[52] U.S. Cl. .................................. 428/496; 427/358; 427/361; 427/364; 427/365; 427/373; 427/382; 427/391; 428/512; 428/514
[58] Field of Search ............... 427/361, 365, 364, 366, 427/373, 358, 382, 391; 428/496, 512, 514

[56] References Cited

U.S. PATENT DOCUMENTS

| Re. 25,884 | 10/1965 | Reiling | 106/128 |
|---|---|---|---|
| 3,002,844 | 10/1961 | Reiling | 106/129 |
| 3,413,139 | 11/1968 | Rasmussen et al. | 427/361 X |
| 3,779,857 | 12/1973 | Hadgraft et al. | 260/17.4 ST |
| 3,862,291 | 1/1975 | Brandon et al. | 427/373 X |
| 3,961,125 | 6/1976 | Suminokura et al. | 428/261 |
| 3,999,773 | 9/1961 | Graulich et al. | 427/391 X |
| 4,038,445 | 7/1977 | Robertson | 427/373 X |
| 4,049,848 | 9/1977 | Goodale et al. | 427/373 X |
| 4,055,694 | 10/1977 | Hadgraft et al. | 428/95 |
| 4,061,822 | 12/1977 | Brodnyan et al. | 428/315 |
| 4,138,518 | 2/1979 | Sammak et al. | 428/95 |

Primary Examiner—Michael R. Lusignan

[57] ABSTRACT

A froth coated paper substrate in which the froth coating may be densified by compression when applied as a frothed resinous emulsion to improve opacity and ink-holdout of the substrate, or applied as a frothed surface size when the coating is a frothed admixture of a resin emulsion and a starch solution, or a frothed starch solution.

27 Claims, 2 Drawing Figures

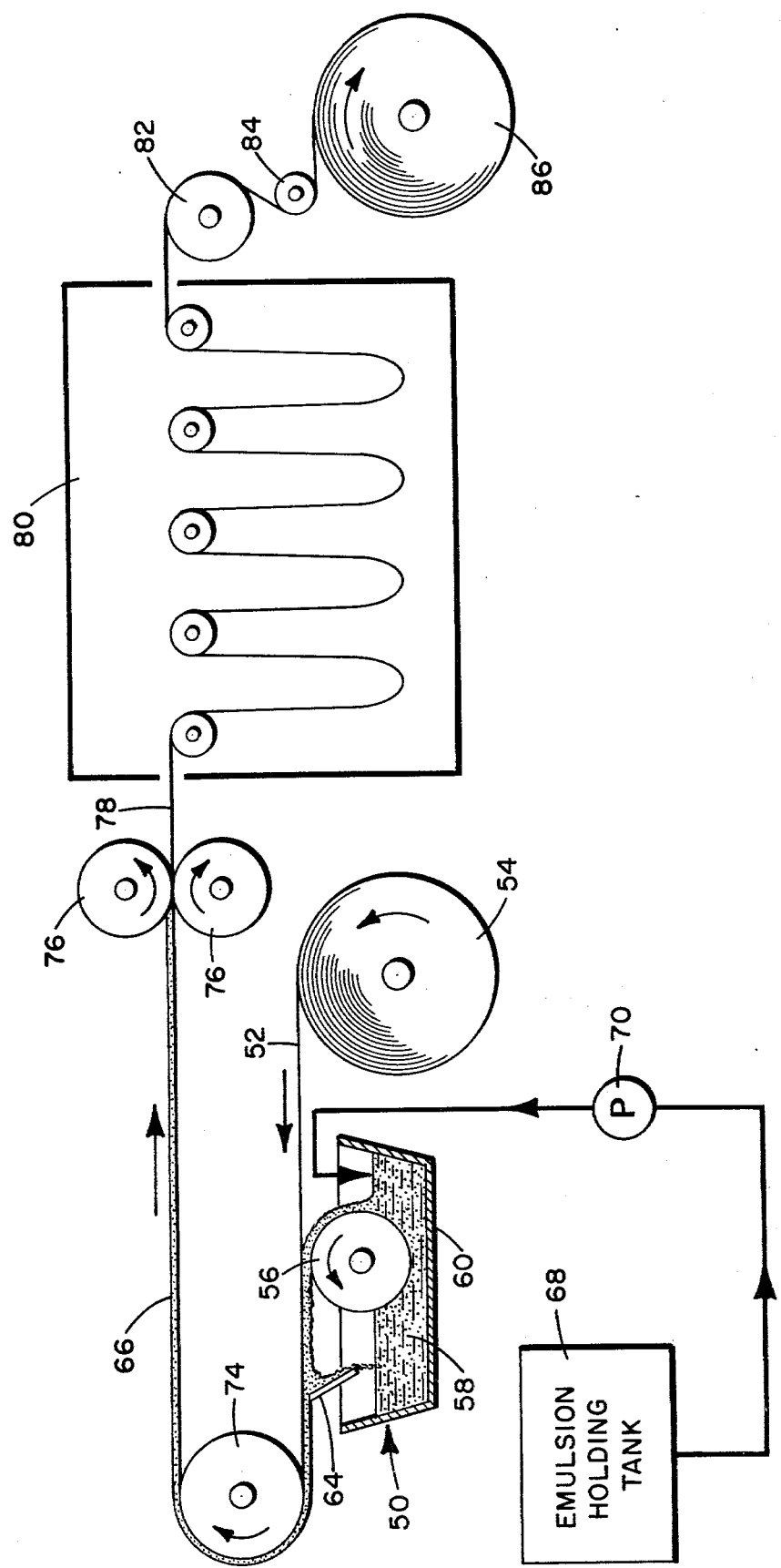

FROTH COATING OF PAPER PRODUCTS AND PROCESS FOR FORMING SAME

BACKGROUND OF THE INVENTION

This invention relates to a froth coated paper substrate having improved opacity and ink hold-out; more particularly it relates to a process of forming a paper product by applying to the surface of a paper substrate at least one coating of frothed elastomeric resin emulsion containing inorganic solids, compressing the froth coating after partial curing to obtain a thin densified surface layer of the frothed coating emulsion to produce a lightweight coated paper. The invention also relates to a froth coated paper substrate sized with a frothed elastomeric resin emulsion containing starch solids, or starch solids per se, in which the starch solids and/or resin-starch solids remain at or near the surface of the substrate in the form of a sizing.

The prior art has been for a long time reflecting work on improving the coating or surface treating of paper, particularly in the area of improved opacity and ink hold-out. The patents to Reilings U.S. Pat. No. 3,002,844 and U.S. Pat. No. Re. 25,884 show coating of paper by using a pigment paper coating of a mixture of water-soluble gum, alkali-soluble, water-soluble protein, and paper pigments to eliminate cast coating and thus produce a very thin or lightweight coat application to the surface of paper.

In the patent to Rasmussen et al U.S. Pat. No. 3,413,139, improved ink hold-out and a modification of surface characteristics of paper were produced by applying to a continuously moving web of paper a plurality of coats or aqueous mineral pigment and a binder and drying after each coat, followed by calendering the coated paper only prior to the last coating operation. The patent to Graulich et al U.S. Pat. No. 2,999,773 discloses a process for producing sheet material, including paper, by applying to one side of a compiled fiber web a coating of latex foam, passing the coated material through a dryer and, after treating the other side with latex foam, passing the web between nip rolls and through a dryer to produce a sheet material impregnated on both sides. Simulated leather was formed by the processes set forth in the patent to Brodnyan et al U.S. Pat. No. 4,061,822 by coating a nonwoven web with a foam, partially drying it, and then applying a compressive crushing of the partially dried foam followed by plating or embossing to form the substitute leather product after a final heat curing.

As will become apparent, the present invention presents an improved coated paper product, paper coating composition, and method of forming same which provides the paper industry with a thin lightweight coating that exhibits greater opacity and print hold-out with the use of a lesser amount of a coating composition thus permitting the use of thinner paper substrates than heretofore usable in the art.

SUMMARY OF THE INVENTION

This invention encompasses the forming of a coated paper product having at least one thin compressed frothed surface coating of a curable elastomeric resin emulsion containing at least 10 parts by weight of paper coating, filler or extender solids based on 100 parts by weight of the elastomeric resin solids.

The invention also contemplates a froth sizing wherein starch is included in the size, the size being either an admixture of a starch solution with resin emulsion or a solution of the starch solids. The size composition may contain up to 100 parts by weight of starch solids to 100 parts by weight resin solids, it being appreciated that the starch solids in a size remain at or near the surface of the paper product rather than substantially penetrating into the paper product.

In the froth surface treatment of the paper, either a size alone can be used or a size plus a froth coating of a resin emulsion can be used, or the resin emulsion per se can be used as set forth hereinafter.

The process of forming the coated paper substrate is accomplished by first preparing a curable and/or cross-linkable elastomeric resin emulsion and mixing therein inorganic solids and/or starch solids to form a coating composition, frothing the coating composition to induce therein a plurality of very fine cells by aeration, spreading the frothed emulsion uniformly as a thin coating over a continuously moving web of paper substrate, and thereafter partially curing the frothed coating. The partially cured froth coated paper substrate is then passed between compression roller means where the froth is compacted to form a dense froth coating, with the surface of the coating adjacent to the surface of the paper substrate and in contact with it penetrating the surface of the paper to produce a densified coating. The coating thus produced is finally cured to form a coated paper which has an adhered coating of a smooth densified froth which, due to its compactness provides for a high degree of surface coverage of the individual fibers in the surface of the paper and, where starch is incorporated, a compacted sizing of the surface of the paper. Such a coating requires a smaller amount of emulsion than heretofore known in the art to produce a lightweight coated and/or sized paper with improved opacity and print-out, thus providing an improved product with a large cost saving factor because of the reduction in emulsion needed to produce a given result. In applications where a base coating is used to produce greater adhesion to the surface of the paper an additional finished coating can be applied to provide the desired surface such as will be more acceptable to printing.

Advantageously, the compression roller means may have a smooth surface which will provide a fine, even finish, or it may be an embossed roller means that will produce a patterned or intaglio effect by compacting some areas of the coated surface more than others.

It will be appreciated that the process of this invention makes it possible to form high quality textured and/or printed paper substrates that exhibit an outstanding ability to accept printing and have a high degree or opacity with very little coating material needed, thus making excellent printed papers and wall paper products. Also, due to the froth penetration of the fibers of the paper as opposed to the usual bridging-over when a liquid coating is used, there is a stronger adherence of the coating to the paper thus preventing the coating from stripping from the paper. This is particularly advantageous where wall paper is produced with a densified froth coating since the removal of nails that have been driven through the wall paper prevents a stripping of the coating in the area about the nail holes.

A typical means for producing a curable and cross-linkable frothed elastomeric resin emulsion and/or one containing starch solids that may be used in the process of this invention is disclosed in application for Letters Patent Ser. No. 969,440 entitled "Process for Forming High Viscosity Coating Compositions" which applicant has incorporated herein by reference. It will be further appreciated however that any known system of frothing of the elastomeric resin emulsion that will produce a fine homogeneous bubble formation in the emulsion that is spreadable or otherwise applyable in a thin coat on a moving web of paper substrate may be used, and where starch particles are present as a part of the emulsion, they provide or aid in the fiber bonding of the coated surface to produce a paper product with an improved surface.

BRIEF DESCRIPTION OF THE DRAWINGS

These and other objects of the invention will become apparent from the following description of the preferred embodiments and the appended claims and the following drawings, in which:

FIG. 2 is a diagrammatical arrangement showing the employment of a stick rack type of dryer and embossing rolls for forming densified froth coated paper substrates such as textured wall paper.

DESCRIPTION OF THE PREFERRED EMBODIMENTS

Figure 1:
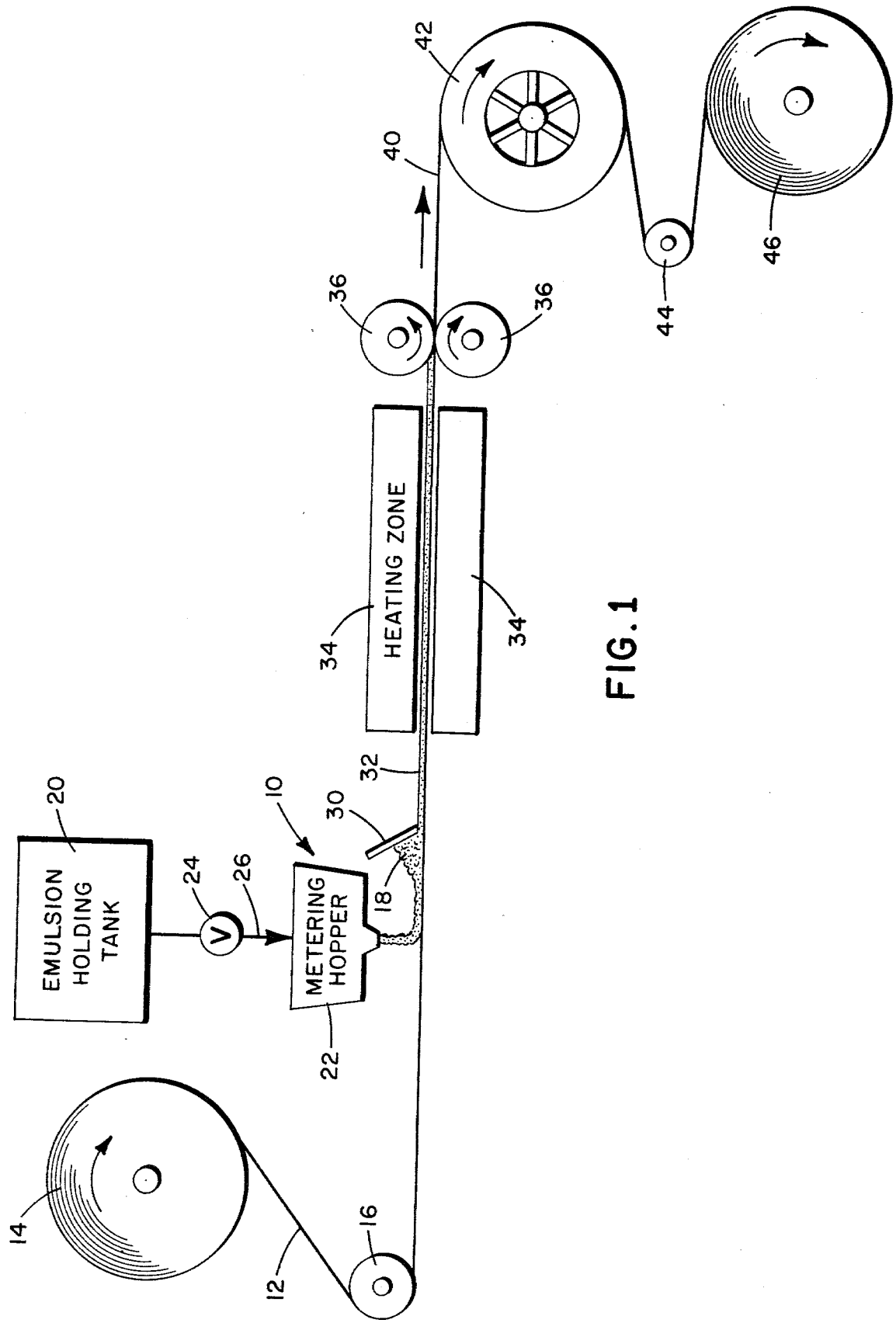
FIG. 1 is a diagrammatical arrangement showing a process for forming the densified froth coated paper substrate of this invention.

Broadly, this invention relates to a process for applying a new and different type of coating to paper substrates, particularly those that are required to accept printing and must exhibit opacity as one of their main characteristics while still maintaining good surface characteristics. Also, when the surface of the paper substrate must be textured in combination with printing for uses such as wall paper, the product of this process provides for a simple and easy method of producing such a paper product. Because of the technology that evolved from the process of this invention, that is the application of at least one thin layer or coating of a dense froth of an elastomeric resin emulsion containing inorganic and/or starch solids and having very small bubbles or fine cells in the frothed recipe and compressing this frothed coating after partial curing to densify the coating and, where starch is present, also to densify the sizing, there is produced a coated paper substrate which has a fine surface and coating that is more securely attached to the surface of the paper substrate than heretofore produced in the art.

Exemplary of the process of the invention is the diagrammatical arrangement presented in FIG. 1 in which numeral 10 illustrates schematically the process steps for coating a continuous web of paper. The web of paper 12 is fed from a supply roll 14 around a drum 16 which may be heated to assist the paper 12 in accepting a frothed emulsion 18. The emulsion 18 is fed from a holding tank 20 to a metering hopper 22 which deposits a continuous supply of the emulsion 18 onto and laterally across the face of the moving web of paper 12. A control valve 24 can be used to control the flow of emulsion from the holding tank to the metering hopper 22 through a conduit line 26. A doctor blade or scraper 30 is adjustably positioned laterally across the face of the web of paper 12. The doctor blade 30 can be adjusted to doctor a thin coating 32 of the frothed emulsion 18 of the desired thickness. The coated web of paper 32 is then passed through a heating zone 34 where a partial curing of the frothed emulsion 18 takes place. From the heating zone 34 the coated web of paper 32 passes between a pair of calender rolls 36 where the partially cured coating is highly compressed to produce a densified froth coated paper 40 which has the texture and appearance of a solid coating.

The calender coated web of paper 40 is then passed around a heated drum 42 for the final cure of coated web of paper and from the heated drum is passed over a godet roll 44 which guides it onto take-up roll 46 as the final densified froth coated paper product.

The densified froth coating produced in accordance with the process of this invention provides for a greater coverage of the surface fibers of the paper being coated based on the amount of emulsion used and, of course, provides a slightly resilient surface for the acceptance of offset and other types of printing with improved hold-out characteristics while still providing the desired opacity.

In FIG. 2 there is illustrated diagrammatically an alternate process arrangement 50 for producing a densified froth coating on a paper substrate. A continuous web of paper 52 is fed from a bulk paper supply roll 54. The bottom surface of the web of paper 52 is constantly passed over a roller applicator 56 which feeds frothed emulsion 58 from feed tray 60 into contact with the bottom surface of the web of paper 52, thus applying a coating to its surface. An adjustable doctor blade 64 positioned across the undersurface of the web of paper and lateral to it is spaced from the surface of the paper so as to produce the desired thickness of coat, with the excess scraped off by the doctor blade and dropping into the feed tray 60 to form a coated web of paper 66.

The feed tray is continuously supplied with frothed emulsion 58 from an emulsion holding tank 68 by means of a pump 70 through conduit line 72.

The froth coated web of paper 66 is passed over an inverting roll 74 which may be heated to produce a partial curing of the frothed emulsion before the web of coated paper 66. The coated paper 66 is then passed between a set of compression and embossing rolls 74 where an uneven densifying of the frothed coating produces the desired embossed surface pattern in the surface of the coating as well as aiding in its adhesion to the surface of the web of paper by the coating being forced about and around the surface fibers of the paper. It is believed that the cells break at the interface between the surface fibers and the adjacent surface of the coating so that the coating is distributed more efficiently thus enhancing the bond between the coating and the surface of the paper.

From the compression and embossing rolls, the coated web of paper 78 is passed through a conventional stick-rack dryer 80 where the coating is finally cured. After curing, it exits from the stick-rack dryer 80 over guide roll 82 and around godet roll 84 which directs the finished coated paper product to conventional take-up roll 86.

It will be appreciated that other methods for applying this coating may be used such as cast coating, air knife coating, spring coating, transfer roller coating, roll-over bed plate coating, and the like as long as the coating method used will efficiently deposit a thin substantially even coat without disrupting the fine celled composition of the frothed emulsion.

Also, where a base coat is used in a multiple coating application an additional metering hopper 22 and doctor blade 30 can be positioned in the process line for each coat so that a desired homogeneous coating can be produced in a continuous manner.

It will be appreciated also that the coating applied to the paper substrate may be supercalendered to produce a very fine finish.

The frothed curable and cross-linkable resin emulsion used to form the densified coating may be formed from elastomeric or flexible polymers in which the polymer chain contains various functional groups pendant from the chain that exhibit good low-temperature curability without the addition of other ingredients. Such polymers may be made by the emulsion interpolymerization of a conjugated diene, such as butadiene, with, inter alia, an ethylenically unsaturated functional monomer such as an α, β-unsaturated carboxylic acid, unsaturated dicarboxylic acids, mono-esters of such dicarboxylic acids, acrylamides and N-methylolacrylamides. In addition to the conjugated diene and the functional monomer, the polymerization mixture may also contain a secondary copolymerizable monomer such as styrene, acrylonitrile, methyl methacrylate, vinylidene chloride and the like. Also cis-polyisoprene latices, natural rubber latices, mixtures of natural latices with cold SBR latices and other synthetic latices may be used.

It has been found that excellent densification can be accomplished when the components of the emulsion to be frothed are selected from the group consisting of acrylic polymers, polyvinyl acetate, starch, styrene-butadiene copolymers, vinyl chloride-acrylic copolymers, vinylidene chloride-vinyl chloride copolymers, neoprene, nitrile rubber, and natural rubber, and mixtures thereof.

Advantageously, the frothed elastomeric emulsion of this invention may be of a viscosity of from about 2000 cps to about 10,000 cps and higher. It has also been found that high viscosity compositions or formulations which include both polymeric constituents and extenders having a solids content on a dry basis of from about 76% to about 86% produce improved high solids compositions which exhibit excellent froth stability when coated on the surface of the paper substrate, thus allowing for a high degree of densification which improves the cured coating making it possible to have good opacity and ink hold-out as well as improved adhesiveness of the base coat to the surface of the paper substrate.

Exemplary of the paper coating solids that may be used in the frothed emulsion are finely divided inorganic compounds such as whiting ($CaCO_3$), barytes, alumina, titanium dioxide, clays, pigments, and the like. The paper coating inorganic solids may be added up to about 800 phrs on a dry basis. The inorganic solids impart to the coating properties such as opacity, fire retardance, ink acceptance and ink hold-out as well as color. Also, starch may be used to impart sizing characteristics to the paper surface and, when starch is used under gelatinizing drying conditions, as set forth in U.S. Pat. No. 4,138,518, an additional measure of adhesiveness of the base coat to the surface of the paper substrate is produced. In those compositions where starch is incorporated, the emulsion may contain from about 30 to about 90 phrs latex and from about 70 to about 10 phrs starch, as taught in U.S. Pat. No. 4,138,518, the disclosure of which is incorporated herein by reference.

The starch to be used in the composition of the invention must be one which does not result in excessively high viscosity when mixed with the aqueous latex and inorganic filler. Either cooked or uncooked starch may be used. Both root and cereal starches may be used. The starch may be either unmodified or modified as by oxidation, acid treatment, ethoxylation and the like provided the crystal structure of the native granules is not destroyed and the starch gelatinizes when heated. The granular starches may be derived from corn, potato, tapioca, wheat, rice, waxy sorghum, waxy maize, etc. The use of starch as a filler and/or extender is disclosed in U.S. Pat. Nos. 3,779,857 and 4,055,694, the disclosures of these two patents being incorporated herein by reference.

It will be appreciated that known dispersants, such as sodium salts of the copolymers of maleic anhydride and diisobutylene, sodium sulfate of higher fatty alcohols, sodium silicate, tetrasodium pyrophosphate, and the like; thickeners such as ethyl acrylate, methacrylic acid, and the like; froth stabilizers such as ammonium stearate, carboxylated acrylic thickener, and the like; cross-linking agents such as melamine formaldehyde resin and the like; flame retarders such as aluminum trihydrate and the like; and pH adjusters such as ammonium hydroxide and the like, may be used in the formulation of the emulsion.

Advantageously, the froth coating may be subjected to pressures of from about 50 psi to about 2000 psi and to final curing temperatures of from about 250° F. to about 300° F. The pressure employed to form the densified froth coating will depend somewhat on the curing temperatures and the degree of reduction of the froth surface desired. Where super-calendering is used or where densifying includes the formation of an embossed surface, higher temperatures and pressure may be used such as temperature of from about 250° F. to about 500° F. and pressures of from about 500 psi to about 2000 psi. The densified paper coating processed under the above temperature and pressure ranges have been found to produce good results. The pressure and temperature employed also will depend upon the nature of the paper substrate and the smoothness desired of the finished surface.

It has been found that for paper coating, the thickness of the applied froth should be from about 0.003 inch to about 0.080 inch and that compression should be from 80% to 98% for intaglio surfaces. Thickness of the applied foam of from about 0.015 to about 0.063 inch has been found to produce excellent results. The thickness of the coating will depend of course on the type of paper being coated and, in the case of wall paper, the thickness of the applied froth will be in the upper part of the thickness range. Where a smooth surface is desired up to 99% compression may be used. It will be appreciated that the densified froth coating will always contain minute cells which aid in the printing of the surface and greatly improve the coated paper opacity thus permitting use of thinner paper to produce a given opacity.

In froth layers, before compression, it has been found that the weight of the solids on a dry basis of from about 5 to about 25 lb./cu.ft. crushed to a weight of solids on a dry basis of from about 10 to about 80 lb./cu.ft. produced good densified foam surfaces on paper substrates. It has been found that compression in thickness of from about 2 to about 6 mils produces good results; and the deposited froth layers can be up to 10 oz./yard dry crushed pressure.

The froth can be formed in a standard mixing head where the emulsion containing inorganic solids and air are metered with the mixing performed at high speed to produce the fine celled froth. The fine cells in the froth, which are randomly dispersed, should have an average cell size less than 0.032 inch and occupy 50% or more of the total volume of the froth coating before densification.

The term "elastomeric" as used in the compositions of this invention covers natural or synthetic high polymers whose physical properties include good elastic recovery after being deformed or otherwise stressed after the polymers have been cured and/or crosslinked. When these elastomeric compositions and/or the starch solutions are aerated to produce a froth with fine cells and applied to a paper substrate, processed in a continuous manner, there is formed a flexible coating that, when rolled or otherwise pressure treated for use as a printed paper product, resists flex-cracking or peeling.

In order to describe more clearly the nature of the present invention, specific Examples will hereinafter be described. It should be understood, however, that this is done solely by way of example and is intended neither to delineate the scope of the invention nor limit the ambit of the appended claims.

The following elastomeric resin emulsion formulations for coating paper substrates, when processed in accordance with the process of this invention, illustrate that an improved coated paper product is produced when a froth coating having fine cells is densified.

EXAMPLE I

The following ingredients were compounded together into a formulation for coating on paper:

| | Parts | |
|---|---|---|
| Latex (polymer of ethyl acrylate, acrylonitrile, and N-methylol-acrylamide)[1] | 100 | (based on polymer solids) |
| Disodium N-octadecylsulfosuccinamate | 1.0 | |
| Sodium silicate | 0.1 | |
| Tetrasodium pyrophosphate | 0.2 | 75.3 |
| Titanium dioxide | 20.0 | |
| Clay (hydrated aluminum silicate) | 55.0 | |
| Diammonium phosphate | 0.5 | |
| Hexamethylol methoxy melamine | 5.0 | |
| Dimethyl siloxane | 0.25 | |
| Alkyl phenol ethoxylate[2] | 2.0 | |
| Carboxylated acrylic thickener[3] | 0.3 | |
| Ammonium stearate | 5.0 | |

[1]Tylac 90-608 manufactured by Reichhold Chemicals, Inc., White Plains, N.Y.
[2]Polystep F-9 manufactured by Stepan Chemical Co.
[3]Alco L-15 manufactured by Alcolac Chemical Co., Baltimore, Md.

The above formulation was applied to a kraft paper substrate and doctored to a coating thickness of 0.008 inch. The coating paper substrate was then passed over a heated drum to partially cure the coating. After the partial cure, the coated paper substrate was passed through a set of calender rolls to produce the final densification and then over a heated drum where the densified coating was cured at a temperature of 400° F.

The coating so produced was tested for opacity and ink-holdout and exhibited an improvement in both opacity and ink-holdout over paper coated with the same quantity of emulsion, unfrothed.

EXAMPLE II

The same froth formulation as described in Example I was processed in the same manner as Example I, except that the surface of the calender rolls had a relief pattern. The resulting paper product produced had an intaglio pattern area where the raised portions had one degree of densification and the other areas had a greater degree of densification.

The coated paper was tested and exhibited the same improvements in opacity and ink-holdout as the finished coated paper product produced by the method of Example I.

EXAMPLE III

The following ingredients were compounded together into a formulation for coating on paper:

| | Parts | |
|---|---|---|
| Latex (polymer of butadiene, styrene, carboxylic acid)[1] | 100.0 | (based on polymer solids) |
| Ammonium lauryl sulfate | 3.0 | |
| Disodium N-octadecyl sulfosuccinamate | 2.0 | |
| Ammonium stearate | 3.0 | |
| Sodium silicate | 0.4 | |
| Tetrasodium pyrophosphate | 0.50 | 415.9 |
| Titanium dioxide | 25.0 | |
| Clay (hydrated aluminum silicate) | 390.0 | |
| Carboxylated acrylic thickener[2] | | 0.1 |

[1]Tylac 68-409 manufactured by Reichhold Chemicals, Inc., White Plains, N.Y.
[2]Alco 6940 manufactured by Alcolac Chemical Co., Baltimore, Md.

The above formulation was applied to kraft paper substrate for use as wallpaper and doctored to a coating thickness of 0.050 inch. The coated paper substrate was then passed over a heated drum to partially cure the coating. After the partial cure, the coated paper substrate was passed through a set of calender rolls to produce the final densification and then over a heated drum where the densified coating was cured at a temperature of 400° F.

The coating so produced was tested for opacity and ink-holdout and exhibited an improvement in both opacity and ink-holdout over paper coated with the same quantity of emulsion, unfrothed.

EXAMPLE IV

The same froth formulation as described in Example III was processed in the same manner as Example III, except that the surface of the calender rolls had a relief pattern. The resulting paper product produced had an intaglio pattern area where the raised portions had one degree of densification and the other areas had a greater degree of densification.

The coated paper was tested and exhibited the same improvements in opacity and ink-holdout as the finished coated paper product produced by the method of Example III.

EXAMPLE V

The following ingredients were compounded together into a formulation for coating on paper:

| Base Coat | | Parts, Dry |
|---|---|---|
| Latex (carboxylated SBR)[1] | | 100.0 |
| Cooked starch solution containing water to 63% T.S. hydrasperse | 313 | 340.0 |
| Clay and Penford 280 gum used as the starch ingredient | 27 | |
| Hydrasperse clay 313 | | 469.0 |
| Melamine formaldehyde resin[2] | | 1.0 |
| Ammonium hydroxide to pH 9.0 to 9.3 | | 0.6 |

The compounded base coat has a viscosity = ~3760 cps and when applied to the surface of the paper had a coating density = ~6#/3000 sq.ft.

-continued

| Top Coat | Parts, Dry | |
|---|---|---|
| Latex (polyvinyl acetate/acrylate)[3] | | 100 |
| Sodium polyacrylate[4] | | 0.13 |
| Sodium hydroxide | | 0.15 |
| Clay (hydroglass)[5] | 275.0 | 275.2 |
| Tetrasodium pyrophosphate | 0.2 | |
| Clay (hydrasperse) | | 225 |
| Kelgin QM[6] | | 1.45 |
| Calcium stearate[7] | | 3.9 |
| Ammonium hydroxide to pH 9.4 | | |

The compounded top coat had a viscosity = ~5440 cps and when applied as a top coat to the coated paper had a coating density = ~5.2#/3000 sq.ft.

[1] Tylac 68-405 manufactured by Reichhold Chemicals, Inc., White Plains, N.Y.
[2] Cymel 385
[3] Plyamul 40-448
[4] Tamol 850
[5] Hydragloss
[6] Thickener made from seaweed
[7] Nopcote C-104

The above formulation was applied to a kraft paper substrate for use as commercial paper and doctored to a coating thickness of 0.050 inch. The coated paper substrate was then passed through an oven to partially cure the coating. After the partial cure, the coated paper substrate was passed through a set of calender rolls to produce the final densification.

The coating so produced was tested for opacity and ink-holdout and exhibited an improvement in both opacity and ink-holdout over paper coated with the same quantity of emulsion, unfrothed.

EXAMPLE VI

A starch sizing solution was prepared from an oxidized starch product and the solution frothed in a high speed mixing head until a froth of high consistency was produced.

The froth starch solution was doctored on a kraft paper substrate to a thickness of 0.010 inch and treated in a conventional manner.

The sized paper produced exhibited improved surface characteristics over a kraft paper conventionally sized with an unfrothed size having the same weight as the frothed size applied.

While certain preferred embodiments of the invention have been illustrated and described in detail, it is to be understood that changes may be made therein and the invention practiced in other forms. It is not, therefore, my intention to limit the patent to the specific details described, but to cover the invention broadly in whatever form its principles may be utilized.

What is claimed is:

1. A process for producing a smooth coated paper product having improved opacity and ink hold-out characteristics comprising:

(a) applying at least one coating to the surface of a paper substrate of a frothed emulsion containing a plurality of very fine cells formed from a curable elastomeric resin emulsion having at least 10 parts by weight of filler solids based on 100 parts by weight of elastomeric resin solids;

(b) spreading said frothed elastomeric resin emulsion over the surface of a paper substrated to produce a substantially uniform, thin frothed coating;

(c) partially curing said applied thin frothed coating;

(d) passing said partially cured froth coated paper substrate through a set of calendar rolls to compress said frothed coating to reduce its thickness by about 80 to about 99 percent to form a thin, densified smooth layer, the said layer being from about 2 to about 6 mils in thickness; and (e) finally curing said densified frothed coating to form a smooth continuous coating intimately bonded to the surface of the paper product.

2. The process of claim 1 in which said frothed elastomeric resin emulsion contains from about 50 parts to about 500 parts by weight of filler solids based on the elastomeric resin solids in the emulsion.

3. The process of claim 2 in which said solids are substantially inorganic pigments normally used for coating paper.

4. The process of claim 1 in which said smooth thin frothed surface coating of said substrate is embossed by further densifying portions of the thin frothed layer on the surface of the paper to impart thereto a predetermined surface pattern.

5. The process of claim 1 in which said frothed layer on the surface of said paper is unevenly compressed to produced an embossed surface coating having a predetermined surface pattern with some areas more densified than others.

6. The process of claim 1 in which said elastomeric resin emulsion contains natural rubber.

7. The process of claim 1 in which said partial curing is performed at temperatures of from about 200° to about 300° F. and said final curing is performed at temperatures of about 300° F.

8. The process of claim 1 in which said weight of said thin coating is from about 1/5 oz. per sq. yd. to about 10 oz. per sq. yd.

9. The process of claim 1 in which said frothed coating is compressed from a density of from about 5 to about 25 pounds per cubic foot, to a density of from about 10 to about 80 pounds per cubic foot.

10. The process of claim 1 in which said applied uncured frothed coating is uniformly coated on the surface of said paper to a thickness of from about 0.015 inch to about 0.063 inch.

11. The process of claim 1 in which said filler solids are selected from the group consisting of calcium carbonate, clay, barytes, alumina, titanium dioxide, pigments, starch, and the like, and mixtures thereof.

12. The process of claim 1 in which said elastomeric resin of said emulsion contains resins selected from the group consisting of acrylic polymers and copolymers, styrene-butadiene copolymers, vinyl chloride-acrylic copolymers, vinyl acetate polymers and copolymers, vinylidene chloride-vinyl chloride copolymers, neoprene, nitrile rubber, and natural rubber, and mixtures thereof.

13. The process of claim 1 in which said elastomeric resin emulsion contains an acrylic polymer and copolymers.

14. The process of claim 1 in which said elastomeric resin emulsion contains a carboxylated styrene-butadiene copolymer.

15. The process of claim 1 in which said elastomeric resin emulsion contains a vinyl chloride-acrylic copolymer.

16. The process of claim 1 in which said elastomeric resin emulsion contains a vinylidene chloride-vinyl chloride copolymer.

17. The process of claim 1 in which said elastomeric resin emulsion contains neoprene.

18. The process of claim 1 in which said elastomeric resin emulsion contains nitrile rubber.

19. A smooth coated paper substrate having at least one thin densified frothed surface formed on a paper substrate by compressing a thin layer of a frothed elastomeric emulsion according to the process of claim 1.

20. The smooth coated paper substrate of claim 19 having a variably compressed surface that forms an intaglio surface effect with some areas more densified than others.

21. A smooth coated paper substrate having a thin paper base and at least one thin densified adhesive coating formed from a thin frothed layer of a curable resin emulsion containing at least 10 parts by weight of filler solids based on 100 parts by weight of elastomeric resin solids, said densified adhesive coating formed by compression of a partially cured frothed layer to a thickness of from about 2 to about 6 mils and a reduction in thickness of from about 80 to about 99 percent to form on the surface of the thin paper base a smooth continuous thin coating, followed by a final curing of the coating.

22. The smooth coated paper substrate of claim 21 in which said densified adherent coating is formed by applying varying degrees of compression to form an intaglio surface.

23. The smooth coated paper substrate of claim 21 in which two froth coatings are applied to form the coated substrate each coating having a different ratio of the filler solids to the resin solids.

24. A process for producing an improved smooth surface sizing for paper products comprising:
  (a) applying at least one coating to the surface of a paper substrate of a frothed composition containing a solution of starch solids and filler solids, said frothed composition containing a plurality of very fine cells;
  (b) spreading said frothed composition over the surface of a paper substrate to produce a substantially uniform smooth thin frothed size coating; and
  (c) curing said applied thin frothed coating.

25. The process of claim 24 in which said composition is an admixture of a solution of starch solids and an emulsion of curable elastomeric resin solids and said filler solids are at least 10 parts by weight based on 100 parts by weight of said starch solids and elastomeric resin solids.

26. A smooth coated paper substrate having a surface size coating applied according to the process of claim 24.

27. The smooth paper substrate of claim 26 which has a second frothed coating applied over said size coating, said second coating formed by compressing a layer of frothed elastomeric emulsion according to the process of claim 1.

* * * * *